(No Model.)

G. HAVEMANN.
COMBINED CURRY COMB AND BRUSH.

No. 413,662. Patented Oct. 29, 1889.

Witnesses
Wm Musser.
P. W. Sommers.

Inventor
Gustave Havemann
By his Attorneys Wm H. Bates.

United States Patent Office.

GUSTAVE HAVEMANN, OF NEW BREMEN, OHIO.

COMBINED CURRY-COMB AND BRUSH.

SPECIFICATION forming part of Letters Patent No. 413,662, dated October 29, 1889.

Application filed July 15, 1889. Serial No. 317,528. (No model.)

*To all whom it may concern:*

Be it known that I, GUSTAVE HAVEMANN, a citizen of the United States, residing at New Bremen, in the county of Auglaize and State of Ohio, have invented certain new and useful Improvements in Combined Curry-Comb and Brush; and I do hereby declare the following to be a full, clear, and exact description of the invention, such as will enable others skilled in the art to which it appertains to make and use the same.

This invention relates to improvements in combined cylindrical "curry-comb and brush;" and it has for its object to curry or comb the dirt out of the hair of the animal by frictional contact, thus dispensing with the notched curry-comb ordinarily used, the brush portion of the implement being afterward used to thoroughly brush out the dirt and dust, what little would remain in the hair of the animal after the application of the comb.

To this end the invention consists in the novel and peculiar construction and arrangement of parts, as will be hereinafter more particularly described, and specifically pointed out in the appended claims.

Figure 1:
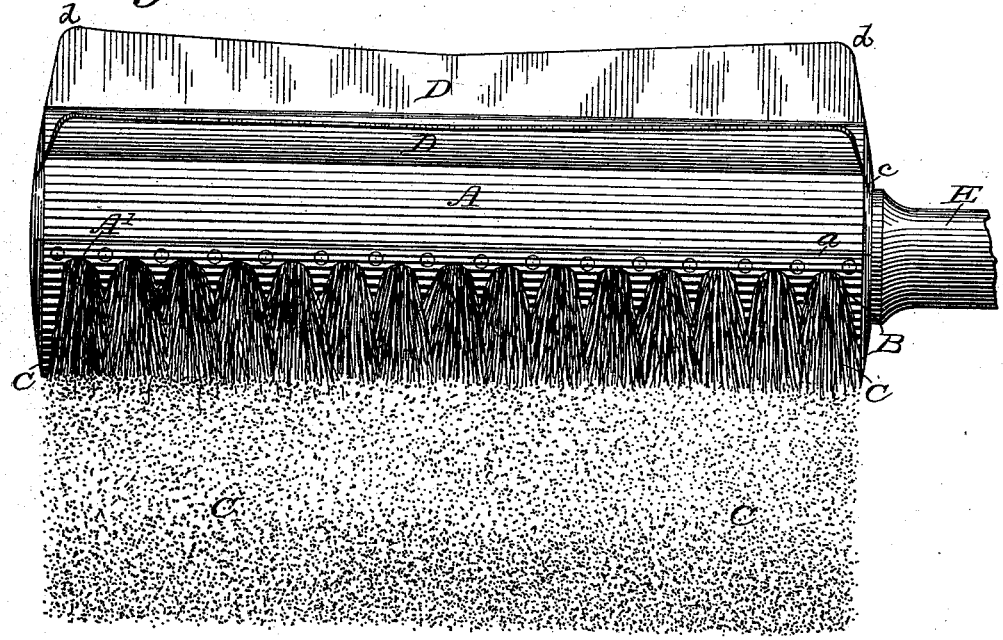
Figure 2:
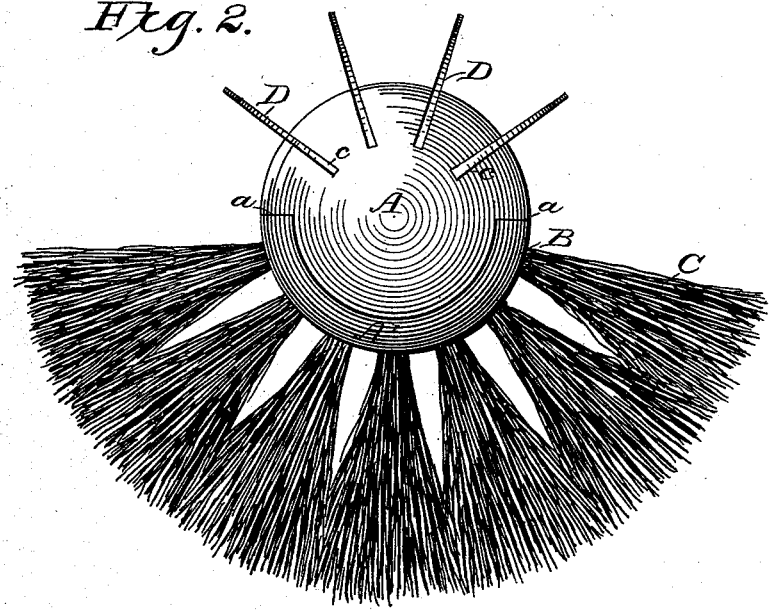

In the accompanying drawings, to which reference is had and which fully illustrate my invention, Figure 1 is a longitudinal view of my improved implement, and Fig. 2 is an end view of the same.

Similar letters of reference indicate corresponding parts in both figures.

In the drawings, A indicates the body of the implement, which is constructed of wood or of any suitable material and of cylindrical form. This cylinder is recessed out longitudinally throughout its entire length and semi-circumferentially to a point, as at $a$. Within this recess is securely seated a piece of leather A', or other suitable material, corresponding to that portion of the cylinder recessed out, which has therein a multiplicity of perforations B. Within these perforations are secured the tapering ends of a number of bristles C, or other suitable material of equal length, grouped or bunched together at a suitable distance apart from each other, covering the area of the piece of leather or other material set in the recess of the cylinder. The free ends of these bristles spread apart, and, contacting with each other at their free ends, present a uniform and neat brushing-surface to the animal, and compose the semi-cylindrical or approximately semi-cylindrical brush portion of the implement or tool. Secured within radially and longitudinally formed kerfs $c$ in the other half of the cylinder are a series of radially and longitudinally and equidistantly arranged metallic blades D, of equal length and width, having their ends curved, as at $d$, Fig. 1, the outer or free working-edges of which are V-shaped or approximately V-shaped in form. These blades are properly glued at their inner edges or those edges secured in the kerfs $c$ in the cylinder A. This half of the cylinder constitutes the curry-comb.

A handle E is secured in any suitable manner to the end of the implement, and it should be long enough to operate upon the animal with both hands, if desired.

It will be perceived that by the peculiar construction of the edges of the blades of my device, which are plain and converge from their ends to the center thereof, and are of approximately V-shaped form, the same will follow closely the sinuosities of all parts of the animal in their operation and clean out thoroughly the dirt from the hair or hide of the animal.

This comb is used by rubbing it backward and forward on the animal, and it will loosen all of the dirt, which will drop out between the comb or blades and not clog up with hair and dirt, as it will do with the ordinary curry-comb that is notched and with which only part of the dirt can be removed, as the notches in the ordinary curry-comb will leave places on the skin or hide that are not touched, while with this comb everything before it is loosened and removed clean by making a few forward and backward movements. With this comb the dirt is loosened, and should any remain in the hair it is removed by using the brush side or portion of the implement or tool. The using of a long handle allows a person to use both hands and make long strokes when the horse or animal is very dirty.

A person may clean his horse with the old curry-comb and brush and think him clean, then take this implement or tool and use it and he finds that he is not cleaned at all, and remove a large amount of dirt that would remain after the cleaning with the ordinary notched comb; but when cleaned with this implement or tool the cleaning is complete and satisfactory.

Having thus described my invention, what I claim, and desire to secure by Letters Patent, is—

1. A curry-comb and brush of the character described, the cylinder or body of which is provided with the radial kerfs and radially-arranged blades having their inner edges properly secured therein and their outer or free working-edges converging in the center to an approximately V-shaped form, substantially as described.

2. The combination, with the semicircular comb or blade portion of the cylinder, constructed as described, of the semicircular brush-backing secured in the semicircular recess of the body of the cylinder and provided with the bristles or other suitable material forming the brush portion or other half of the body of the cylinder, substantially as described, and for the purpose set forth.

In testimony whereof I affix my signature in presence of two witnesses.

GUSTAVE HAVEMANN.

Witnesses:
HENRY ROETTGER,
WILLIAM SCHULENBERG.